(12) United States Patent
Snowden et al.

(10) Patent No.: US 10,991,077 B2
(45) Date of Patent: Apr. 27, 2021

(54) VECTOR TILE PYRAMIDING

(71) Applicant: Ordnance Survey Limited, Southampton (GB)

(72) Inventors: Oliver Snowden, Southampton (GB); Guy Heathcote, Southampton (GB)

(73) Assignee: Ordnance Survey Limited, Southampton (GB)

( * ) Notice: Subject to any disclaimer, the term of this patent is extended or adjusted under 35 U.S.C. 154(b) by 7 days.

(21) Appl. No.: 16/451,145

(22) Filed: Jun. 25, 2019

(65) Prior Publication Data
US 2020/0058099 A1 Feb. 20, 2020

(30) Foreign Application Priority Data
Aug. 17, 2018 (EP) .................................. 18189519.4

(51) Int. Cl.
*G06T 3/40* (2006.01)
*G06T 3/00* (2006.01)

(52) U.S. Cl.
CPC .......... *G06T 3/4084* (2013.01); *G06T 3/0056* (2013.01); *G06T 2207/20021* (2013.01)

(58) Field of Classification Search
None
See application file for complete search history.

(56) References Cited

U.S. PATENT DOCUMENTS

| | | | | |
|---|---|---|---|---|
| 8,457,886 B2* | 6/2013 | Meschenmoser | ....... | G06F 16/29 701/452 |
| 2010/0321399 A1* | 12/2010 | Ellren | ..................... | G06F 16/29 345/587 |
| 2015/0186443 A1* | 7/2015 | Ito | .......................... | G06F 16/29 707/618 |

OTHER PUBLICATIONS

Shea, K. Stewart, "Cartographic Generalization," Jul. 31, 1988, https://www.ngs.noaa.gov/PUBS_LIB/Cartographic_Generalization_TR_NOS127_CGS12.pdf.
Feb. 27, 2019—(EP) Extended Search Report—App 18189519.4.
Jo, Hanbyul, "Mapping the ages of buildings in Seoul," May 15, 2017, https://www.mapzen.com/blog/mapping-seoul-buildings/.

* cited by examiner

Primary Examiner — Delomia L Gilliard
(74) Attorney, Agent, or Firm — Banner & Witcoff, Ltd.

(57) ABSTRACT

Aspects described herein provide a computer-implemented method and system for generating topographic map data at different scales. More specifically, the topographic map data is reduced from large scale to small scale, wherein the scale of the vector features is reduced according to their geometry, feature type and attributes. In order to quickly and easily output digital maps at different scales so that a user may quickly zoom in and out of a map, different zoom levels are produced for different scales, each zoom level containing a variable amount of detail according to its scale, with larger scale zoom levels generally containing more detail than small scale zoom levels. Each zoom level is made up of one or more vector tiles representative of a geographic area, wherein the vector tiles may contain one or more vector features that are representative of objects within that geographic area, and other information related to that geographical area.

20 Claims, 12 Drawing Sheets

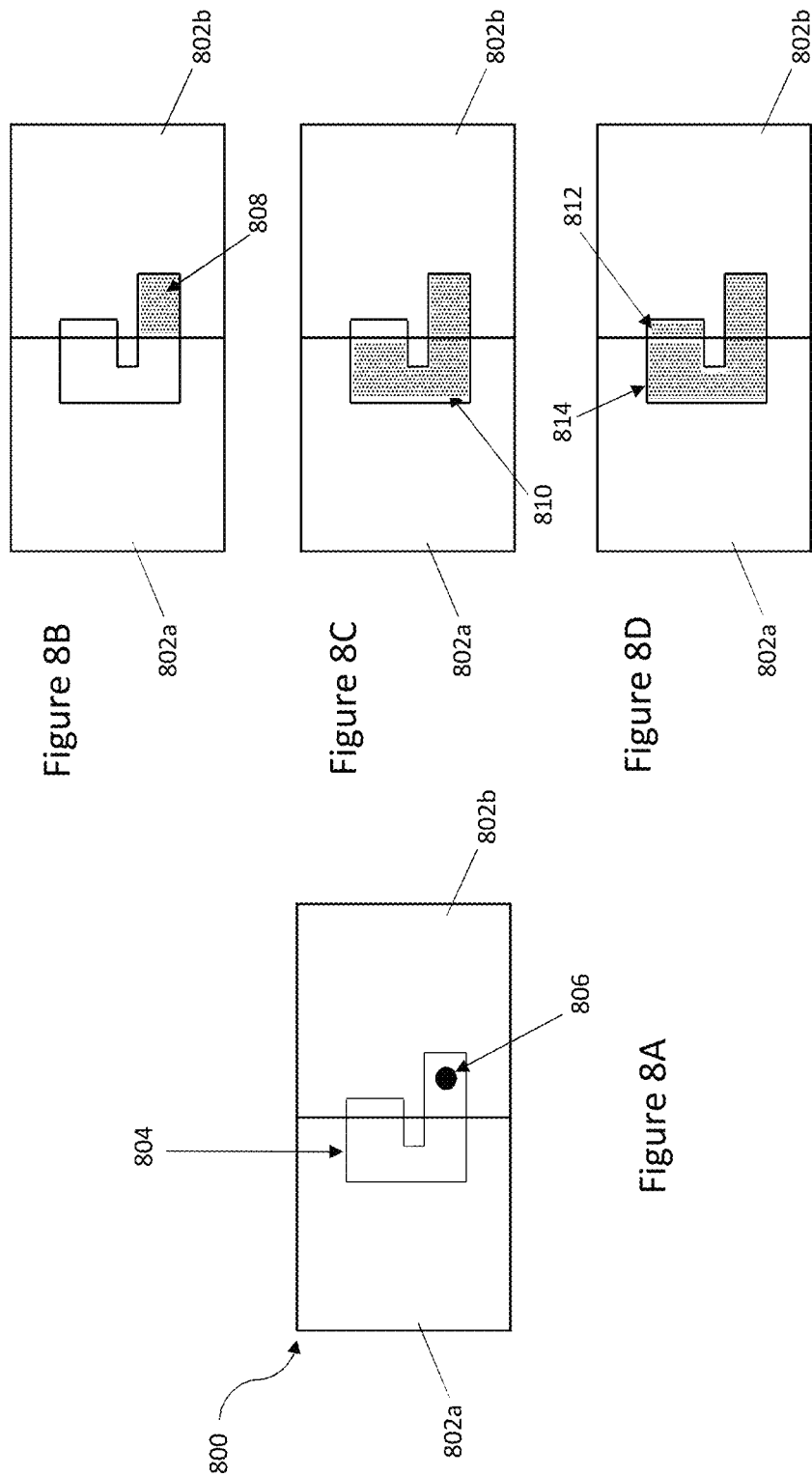

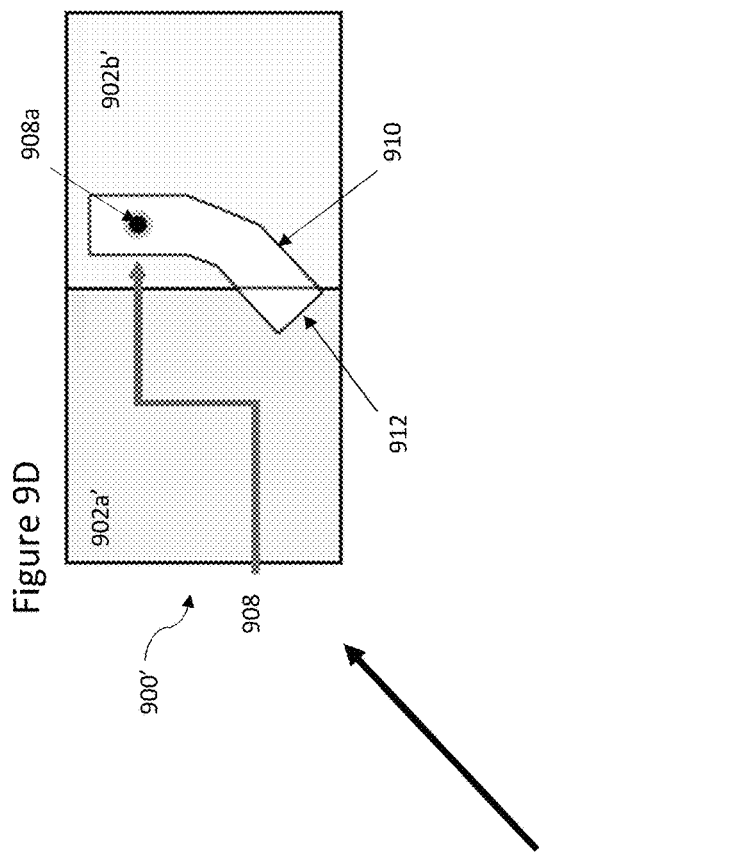
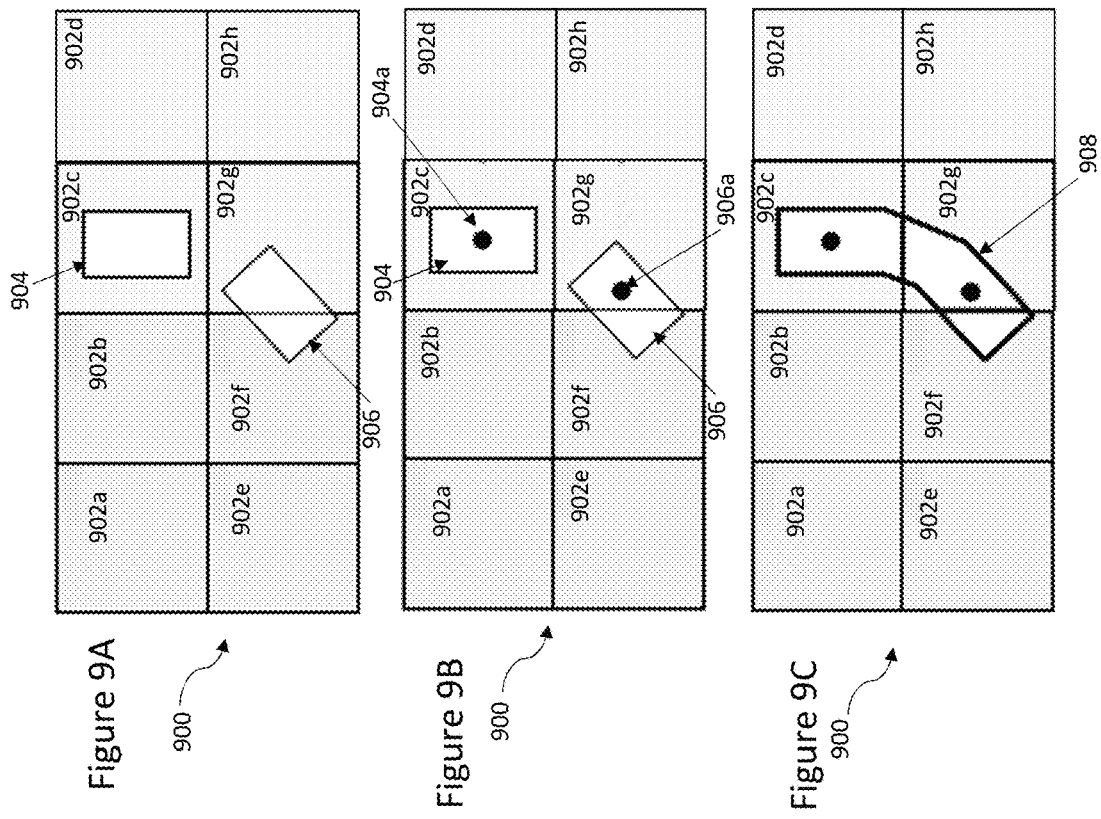

VECTOR TILE PYRAMIDING

CROSS-REFERENCE TO RELATED CASES

This application claims priority to foreign/European Patent Application No. 18189519.4, filed Aug. 17, 2018, entitled "Vector Tile Pyramiding," the contents of which are herein incorporated by reference

TECHNICAL FIELD

Embodiments described herein relate to a computer-implemented method and system for generating map data for use at different scales. In particular, aspects relate to a computer-implemented method and system for reducing topographic map data from large scale to small scale, wherein the scale of the vector features is reduced according to their geometry, feature type and attributes.

BACKGROUND

Modern map data has come under increasing demands for rapid generalisation and scalability in the digital age. Most providers of digital maps rely on a very detailed topographical map database which stores the underlying data. For example, Ordnance Survey uses the very large scale topographic product OS MasterMap®, which records every feature larger than a few metres in one continuous map, and is constantly being updated. The OS MasterMap® product is composed of vector features, each of which has a feature type, geometry, and various feature attributes. It is commonplace to transform vector data, such as OS MasterMap®, into map fragments often known as 'tiles', which can be raster or vector representations. Each tile represents part of a geographic area, which are then used to render a map image.

Users viewing OS MasterMap® data on a digital device zoom in and out depending on their needs. Rather than draw each zoom level separately and dynamically it is more prudent to create different map images at different zoom levels from the underlying map data in advance. This means that any updates to the underlying data will need to be reproduced at all zoom levels. For example, tile pyramiding is a well-known approach to pixel reduction and is used throughout the computing industry in areas such as computer vision, image processing and signal processing. Within the geospatial community, the GeoTiff file format enables bitmap pyramiding such that each resolution is stored as a separate layer within the TIFF for use at different scales. This helps ensure that aerial imagery covering a large area can be accessed quickly without having to read large amounts of high resolution data, which would take additional time and use larger amounts of compute resource. However, such tile pyramiding merely subsamples the image created by the underlying topographic data to create each layer, and does not take into account the feature type or its attributes. Furthermore, for every zoom level of the pyramid created, the amount of storage space required increases, and the visual quality of the resulting image is not always guaranteed since the quality of each level relies on the resolution of the level lower down in the pyramid. It can also take a considerable amount of time to create the pyramid, especially if executed on a small number of computers with limited processing capabilities. For example, it may take a couple of days to produce the pyramid data in the standard linear way.

SUMMARY

Embodiments and aspects described herein address the above noted problems by providing a computer-implemented method and system for generating topographic map data at different scales. Specifically, the topographic map data is reduced from large scale to small scale, wherein the scale of the vector features is reduced according to their geometry, feature type and attributes. In order to quickly and easily output digital maps at different scales so that a user may quickly zoom in and out of a map, different zoom levels are produced for different scales, each zoom level containing a variable amount of detail according to its scale, with larger scale zoom levels generally containing more detail than small scale zoom levels. Each zoom level is made up of one or more vector tiles representative of a geographic area, wherein each vector tile may contain one or more vector features that are representative of objects within that geographic area, such as buildings, roads, rivers, vegetation and the like, and other information related to that geographical area, such as weather and climate data, crime rates, population data or any other information that can be used to describe a region of the Earth. To reduce a zoom level to a smaller scale, a number of vector tiles are merged together according to some suitable transformation function, which reduces the vector features in those vector tiles to the required scale according to their geometry, feature type and attributes. In doing so, important topographic information about those vector features is not lost each time the map scale is reduced. Similarly, the process enables a user to retain specific information and effectively filter out information that is not of interest or use.

This enables access to a reduced set of data, which can be processed far quicker than all of the source data. This provides the ability to choose, either manually or automatically, whether the resulting zoom level provides the required level of detail, and whether it is worth processing further data to improve the quality of the zoom level.

Furthermore, each zoom level can be separated into layers or sub-sets of vector features having different levels of detail according to their feature type, and an appropriate transformation function applied to reduce the scale thereof and produce a number of smaller scale layers. The resulting layers, can then be combined together to produce the new smaller scale zoom level.

A first aspect provides a computer-implemented method of generalising topographic data, the method comprising obtaining a first topographic dataset relating to a geographical area, wherein the first topographic dataset comprises a first set of vector tiles at a first zoom level, the first set vector tiles comprising one or more vector features having a geometry, a feature type and one or more attributes associated therewith, and generating a second topographic dataset relating to the geographical area comprising a second set of vector tiles at a second zoom level by applying at least one transformation function to the first set of vector tiles, wherein the at least one transformation function generalises the vector features of the first set of vector tiles in dependence at least in part on the geometry, feature type and one or more attributes associated therewith.

As such, the scale of the vector features is reduced from a first zoom level to a second zoom level. For example, the first zoom level may correspond to the underlying topographic data at its highest level of data. The scale of the topographic data in the first zoom level may then be reduced to second zoom level having a lower level of detail. By generalising the vector features in the first zoom level according to their geometry, feature type and attributes, this enables features to be generalised in a dynamic and logical way that takes more than spatial proximity into account. That is to say, a group of features will not just be generalised together on the basis that they are within a particular geographic space, but also based on whether they correspond to the same or similar type of feature, and the various attributes of those features. This ensures that the vector features are generalised in a meaningful way such that certain information is retained in the second zoom level, whilst unnecessary information is stripped out.

To achieve the above, the at least one transformation function may generalise a first number of vector tiles in the first set of vector tiles to generate a single vector tile in the second set of vector tiles. The first number of vector tiles in the first set of vector tiles is defined by a scale of the second zoom level. For example, four vector tiles (2×2) in the first zoom level may be generalised to generate one vector tile in the second zoom level, thereby reducing the scale of the topographic data by 2.

The method may further comprise generating a map image of the geographical area at the second zoom level based on the second topographic dataset, wherein the map image at the second zoom level has a smaller scale than a map image of the geographical area generated based on the first topographic dataset.

The first topographic dataset may comprise a first set of layers, each layer comprising vector features having a respective geometry and/or feature type, wherein the method comprises applying a respective transformation function to one or more of the first set of layers to generate a second set of layers in the second topographic dataset. As such, the first topographic dataset can be divided into separate layers of vector features having different geometries and/or feature types. For example, the first topographic dataset may be separated into layers of polygon features, line features and point features, and/or layers of buildings, vegetation, roads, railway lines, waterways, and the like. Each layer may then be generalised separately using separate transformation functions.

In this respect, the transformation function for a layer of the first set of layers may be selected in dependence on the geometry and/or feature type of the vector features contained therein. For example, the transformation function applied to a layer containing buildings may be different to that applied to a layer containing line features such as roads and railway lines. This allows the generalisation to be tailored even further such that the optimal transformation function is used for each of the vector features contained in the first topographic dataset.

For example, the at least one transformation function is configured to perform one or more of: aggregating one or more of the vector features of the first set of vector tiles, combining one or more of the vector features of the first set of vector tiles, simplifying one or more of the vector features of the first set of vector tiles, selecting one or more of the vector features of the first set of vector tiles, eliminating one or more of the vector features of the first set of vector tiles, exaggerating one or more of the vector features of the first set of vector tiles, amalgamating one or more of the vector features of the first set of vector tiles, collapsing one or more of the vector features of the first set of vector tiles, enhancing one or more of the vector features of the first set of vector tiles and merging one or more of the vector features of the first set of vector tiles. Such techniques may be applied to generalise both the geometry and the attributes of the vector features. The feature type may be generalised in some other way, for example, by labelling the vector features with a new feature type classification, that is, re-classifying one or more of the vector features. For example, one or more of the vector features in the first set of vector tiles may be labelled as buildings, and more specifically, hospital, doctor surgery, dentist, physiotherapist and the like. The transformation function may then generalise these vector features together and provide the resulting vector feature with a new feature type classification of 'medical centre'.

The method may further comprise detecting a change in the first topographic dataset, and updating the geometry and/or attributes of at least one vector tile in the first set of vector tiles, and/or updating the geometry and/or attributes of at least one vector tile in the second set of vector tiles in dependence on the detected change. As such, should any of the vector features in the first topographic dataset change in any way, for example, the geometry is altered or new attribute data is added, these changes can be used to update the vector tiles in which the vector feature is contained in both the first and second zoom levels.

In cases where the geometry and/or attributes of a vector tile in the second set of vector tiles is updated in dependence on the change detected in the first topographic dataset, the method may further comprise updating the geometry and/or attributes of at least one vector tile in the first set of vector features in dependence on the geometry and/or attributes of the vector tile updated in the second set of vector tiles. As such, an updated vector tile in the second set of vector tiles may be used to propagate the change within the first zoom level.

For example, consider several line features representative of a road and extending over first, second, third and fourth vector tiles of the first zoom level, wherein all four vector tiles are used to generate a fifth vector tile located in the second zoom level comprising a single line feature, the fifth vector tile being representative of the same geographical area as the first, second, third and fourth vector tiles combined. A change in topographic data set corresponding to the line features of the first vector tile may be detected and used to update the line feature as it is shown in the fifth vector tile. This updated line feature may then be used to update the rest of the line features in the second, third and fourth vector tiles of the first zoom level. This is particularly advantageous for vector features having geometries that extend over large geographic areas. By updating all of the zoom levels in parallel, the time taken to update all of the affected vector tiles at every resolution can be reduced.

The method may further comprise generating a third topographic dataset relating to the geographical area comprising a third set of vector tiles at a third zoom level, wherein the third topographic dataset is generated by i) applying at least one transformation function to the first set of vector tiles, wherein the at least one transformation function generalises a second number of vector tiles in the first set of vector tiles to generate a single vector tile in the third set of vector tiles, or ii) applying at least one transformation function to the second set of vector tiles, wherein the at least one transformation function generalises a first number of vector tiles in the second set of vector tiles to generate a single vector tile in the third set of vector tiles.

That is to say, the third zoom level having a smaller scale than both the first and second zoom levels may be generated by generalising the vector features of the first zoom level or by generalising the vector features of the second zoom level.

As such, the transformation function used will also depend on the difference in level of detail required. For example, the difference in level of detail between the first and third zoom levels is greater than that between the first and second zoom levels, and between the second and third zoom levels, and so the parameters of the transformation function may be adapted to take this into account.

For example, where the vector tiles of the second zoom level are generated from the vector tiles in the first zoom level, the transformation function may apply a buffer to vector features within the first zoom level representative of buildings, for example, a buffer of 5 meters, merge the vector features representative of nearby buildings, and then shrink the resulting area geometry by 5 meters to thereby create vector features representative of building areas in the second zoom level overlaying one or more of the original vector features for the buildings within that area. In contrast, to generate vector tiles for the third zoom level from the vector tiles of the first zoom level, wherein the third zoom level represents a region, the vector features representative of buildings in the first zoom level may need to be buffered by 150 m, merged, and then shrunk by 150 m.

As another example, consider a buffered shape around vector features representative of retail areas comprising multiple buildings therein. The buffered shape enables representation of the retail areas and the individual units within. For example, the individual units may be buffered by 5 metres, merged and shrunk by 3 meters, leaving 2 meters of vector features classified as retail area around the edges of the vector features classified as retail buildings. Each iteration of the transformation function between zoom levels therefore compounds the distance of buffer around the buildings. Consequently, the parameters of the transformation function from the first zoom level to the second zoom level to the third zoom level would be different than those for a transformation function for reducing the vector tiles from the first zoom level directly to the third zoom level. Specifically, the compounded changes from first to second to third would require different parameters at the third zoom level than for direct transformation from the first zoom level to the third zoom level.

The method may further comprise generating a map image of the geographical area at the third zoom level based on the third topographic dataset.

In either case, the map image at the third zoom level has a smaller scale than a map image of the geographical area generated based on the first topographic dataset, and a smaller scale than a map image of the geographical area generated based on the second topographic dataset.

The method may further comprise detecting a change in the first topographic dataset, and updating the geometry and/or attributes of at least one vector tile in the third set of vector tiles in dependence on the detected change. In some cases, the method may further comprise updating the geometry and/or attributes of at least one vector tile in the first set of vector features in dependence on the geometry and/or attributes of a vector tile updated in the third set of vector tiles.

The geometry of the vector features may comprise one or more of: a point feature, a line feature and a polygon feature.

The feature type of the vector features may comprise one or more of: building, road, water feature, vegetation, railway line, and numerical data.

A further aspect provides a system, comprising a processor, and a computer readable medium storing one or more instruction(s) arranged such that when executed the processor is caused to perform a method of generalising topographic data, the method comprising obtaining a first topographic dataset relating to a geographical area, wherein the first topographic dataset comprises a first set of vector tiles at a first zoom level, the first set of vector tiles comprising one or more vector features having a geometry, a feature type and one or more attributes associated therewith, and generating a second topographic dataset relating to the geographical area comprising a second set of vector tiles at a second zoom level by applying at least one transformation function to the first set of vector tiles, wherein the at least one transformation function generalises the vector features of the first set of vector tiles in dependence at least in part on the geometry, feature type and one or more attributes associated therewith.

BRIEF DESCRIPTION OF THE DRAWINGS

Further features and advantages of the aspects described herein will become apparent from the following description of embodiments thereof, presented by way of example only, and by reference to the drawings, wherein:

FIGS. 8A-D illustrate a further example of one or more aspects described herein in use;

FIGS. 9A-D illustrate a further example of one or more aspects described herein in use;

DETAILED DESCRIPTION

Figure 1:
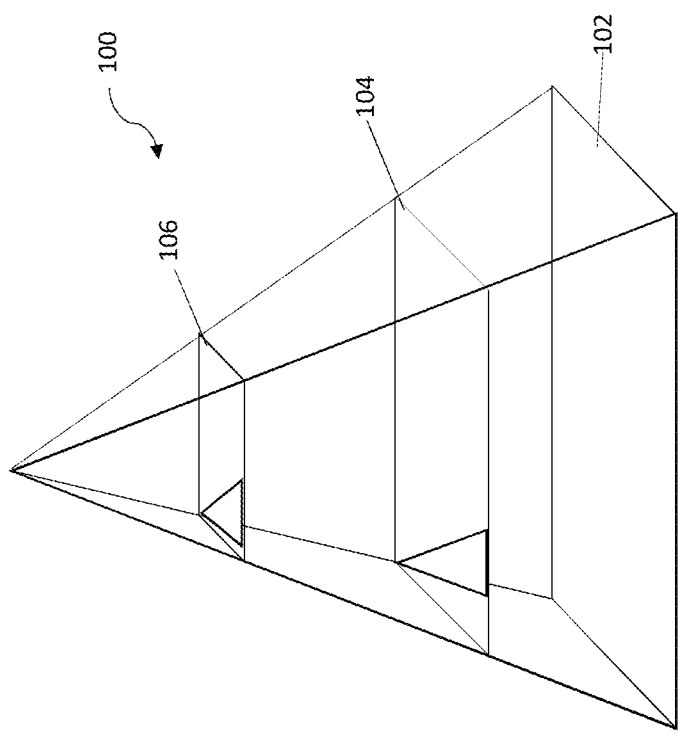
FIG. 1 is a diagram illustrating the prior art.

FIG. 1 illustrates an example of an image pyramid 100, as is known in the prior art. The image pyramid 100 comprises three layers 102, 104, 106, each representing the same geographic area at a different zoom level. The first layer 102 may be the original map image generated by the underlying topographic data stored in the map database and thus shows all of the vector features of that geographic area in the highest level of detail. To create the second layer up 104, for example, at half the resolution, a subsample of the image tiles in the first layer 102 may be taken and mosaicked together in some way. The same can then be repeated to create the third layer 106, for example, at a quarter of the resolution of the first layer 102. However, as discussed above, this form of pyramiding is based on the image tiles and does not take into account the nature of each vector feature used to generate the image, that is, the feature's type or its attributes.

Figure 2:
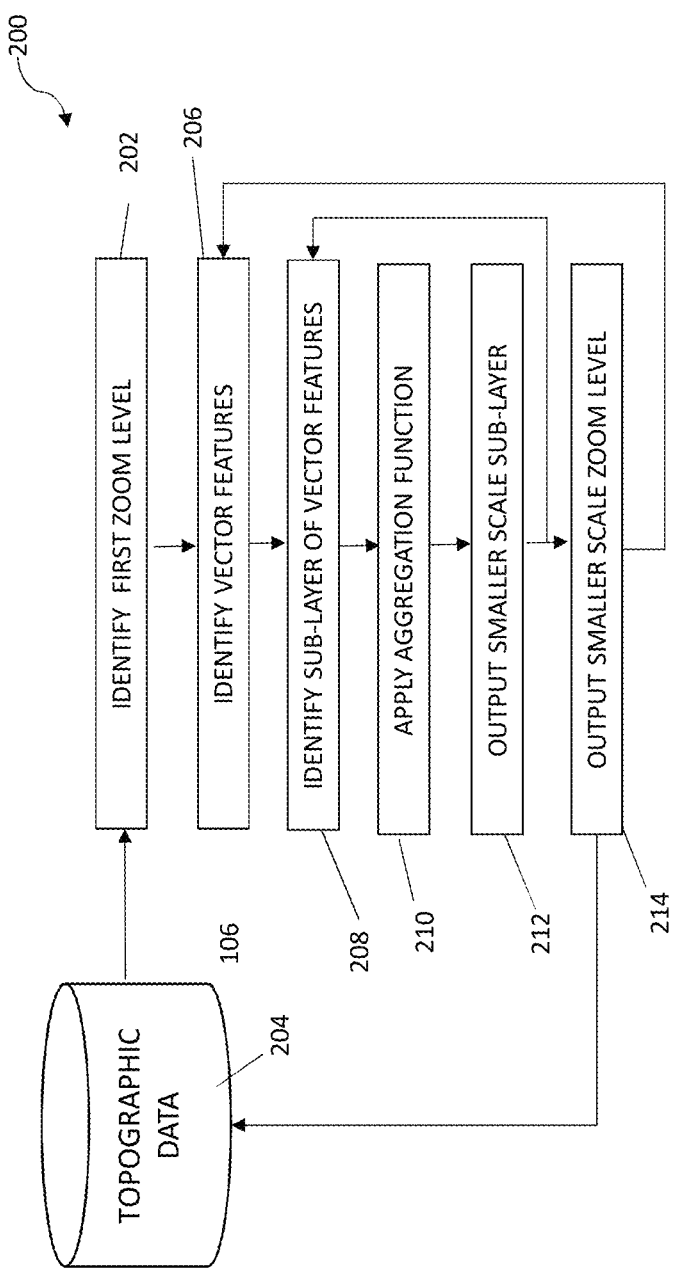
FIG. 2 is a flow diagram illustrating an embodiment according to one or more illustrative aspects described herein.

FIG. 2 shows a method and algorithm 200 of tile pyramiding based on the vector features of the underlying topographic map data.

To begin, the first zoom level of a geographic area is identified (step 202) based on the topographic data stored in the topographic map database 204. As such, the first zoom level is that which describes the geographic area at its highest level of detail, and which would generate a map image of the geographic area at its largest possible scale.

Each zoom level is made of a plurality of vector tiles representing a part of the geographic area, each vector tile being of equal pixel size, for example, each tile may be 256×256 or 4096×4096, and containing a plurality of vector features that represent features of that geographic area. Whilst the data size of each tile may be the same, as this enables processing systems to have predictable processing times, the ground area that each tile covers may vary. For example, in a spherical or ellipsoid projection the tiles would cover a different amount of land depending on latitude. Each vector feature represents a real-world object, or some other feature or aspect of that geographic area, and has geometry, a feature type, and various feature attributes. For example, a vector feature representative of a hospital may comprise geometry describing the area which it covers, a feature type of "building", as well as various attributes such as number of exits, number of levels, number of rooms, age and any other information about the hospital that may be embedded within the vector feature.

The vector features within each vector tile are then identified (step 206), upon which the vector tile reduction is to be performed. In this respect, sub-layers of vector features may first be identified (step 208), for example, based on the type of feature. For example, the vector features may be divided into layers of polygon features representative of buildings, line features representative of roads, line features representative of rail line, line features representative of rivers, or any other suitable group of features. Dividing the features into sub-layers according to their feature type or category helps to ensure that the correct vector features are generalised together, as will be described below.

Once a sub-layer has been identified, for example, vector features relating to buildings, or even a specific type of buildings such as police stations or hospitals, a transformation function will be applied to the vector features of two or more vector tiles to reduce those features to the level of detail required (step 210). Further details of the types of transformation functions that may be used will be described below. The number of vector tiles to which the transformation function is applied will depend on the target scale. For example, to reduce the scale by 2, four vector tiles (2×2) may be merged together in some way, and to reduce the scale by 4, sixteen vector tiles may be merged together. It will be appreciated that this approach may apply to any tile shape that tessellates, such as squares, triangles and hexagons. Similarly, any suitable combination of tiles may be merged together to achieve the desired scale of reduction, for example, 2×1 vector tiles may be merged together.

Once the vector tiles have been merged together as required, a new sub-layer comprising the new vector tiles at the desired scale is output (step 212). This may then be repeated for any other sub-layers of the first zoom level, the new sub-layers being combined in some way, for example, by overlaying on top of each other, to output a new zoom level at the desired scale (step 214).

To produce additional zoom levels at further scales, this may be done starting from the original zoom level by applying the transformation function to different amounts of vector tiles, as described above, or by starting from one of the smaller scale zoom levels and following the same method shown by FIG. 2. That is to say, a zoom level of a particular scale can be generated from any other larger scale zoom level in the pyramid.

As described above, the vector features of the vector tiles in each zoom level may be reduced to the desired scale by any suitable transformation function that is capable of generalising and reducing both the geometry and the attributes of the vector features. The transformation function may employ one or more cartographic generalisation techniques in order to reduce the scale of the geometry of the vector features, which may include, for example, aggregating features, combining features, simplifying features, selecting certain features, collapsing features, enhancing certain features, exaggerating certain features, amalgamating features, eliminating certain features and/or merging features, as well as any other suitable cartographic generalisation technique. For example, a group of buildings may be represented as a single feature covering the same area, dual carriageways may be collapsed and/or merged into a single line feature, and smaller features may be removed altogether.

As with the geometry, the attributes may also be generalised in a number of different ways, for example by adding or aggregating the attributes together, simplifying the attributes, selecting or eliminating certain attributes, taking an average of the attributes, or by generalising the attributes in some other suitable way. For example, a group of buildings having attributes of capacity or number of rooms may be added together, whereas an average of their age is taken. In doing so, new attribute data may be derived as result of the generalisation, for example, by combining the generalised attribute data with data from external data sources corresponding to that geographic area. Using the above example, the attribute data associated with the group of buildings may be combined with energy data to identify areas of high and low energy usage in relation to the size and age of the buildings within that area.

Figure 3:
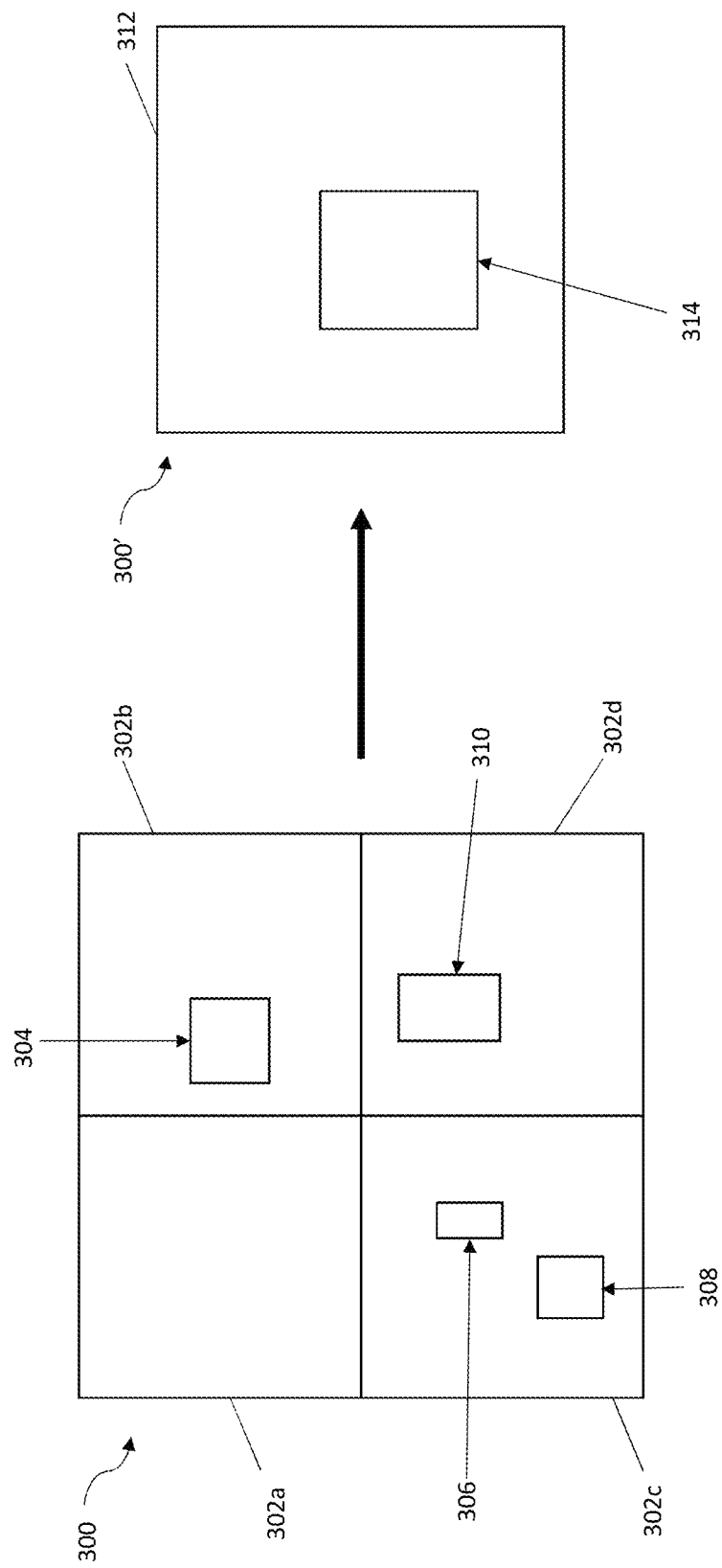
FIG. 3 is a diagram illustrating an example of one or more aspects described herein in use.

An example of a suitable transformation function will now be described with reference to FIG. 3. FIG. 3 shows part of a first zoom level 300 comprising four vector tiles 302*a-d*, each tile representative of a geographic area. For example, each tile 302*a-d* may be representative of an area of 1 km$^2$. Each vector tile 302*a-d* may comprise one or more vector features which may be divided into sub-layers according to the feature type, as described above. In the illustrated example, only the vector features relating to buildings are shown. Here, the first vector tile 302*a* has no vector features, the second vector tile 302*b* has one vector feature 304, the third vector tile 302*c* has two vector features 306, 308, and the fourth vector tile 302*d* has one vector feature 310. As a specific example, the vector features 304, 306, 308 and 310 may all represent shopping centres of varying size and capacity. Each vector feature 304, 306, 308 and 310 has geometry describing the three dimensional size and configuration of the shopping centre, as well as various attributes. For example, the attributes may include the maximum capacity, the average daily footfall, the age of the building, the number of units contained therein, the average daily energy consumption and any other information that may be attributed to the shopping centre.

A transformation function may then be applied to these four vector tiles 302*a-d* in order to reduce the scale of the first zoom level 300, for example, by a factor of 2, so as to generate a new single vector tile 312 at a second zoom level 300' representative of the same 4 km$^2$ previously represented by the original four vector tiles 302*a-d*. In applying the transformation function, the four vector features 304, 306, 308 and 310 have been aggregated together into a single vector feature 314. In this example, the vector features 304, 306, 308, 310 have been combined by taking the sum of the area defined by their geometry, and then positioning the combined feature 314 at a centroid point measured from a central point on the geometry of the individual features 304, 306, 308, 310. An alternative approach, however, might be to take an average of the area defined by the geometry of the individual features 304, 306, 308, 310.

The attributes may then be generalised in any number of ways, as described above. For example, the maximum capacity of the four shopping centres 304, 306, 308 and 310, or the number of units in each shopping centre 304, 306, 308 and 310 may be added together, whereas their respective ages may be averaged.

It will be appreciated that FIG. 3 is not drawn to scale and is only intended to provide an example aspects described herein in use.

Different transformation functions may also be used for different sub-layers depending on the type or category of vector features. For example, the example described with reference to FIG. 3 may not be suitable for a sub-layer containing vector features representative of roads.

Figure 4:
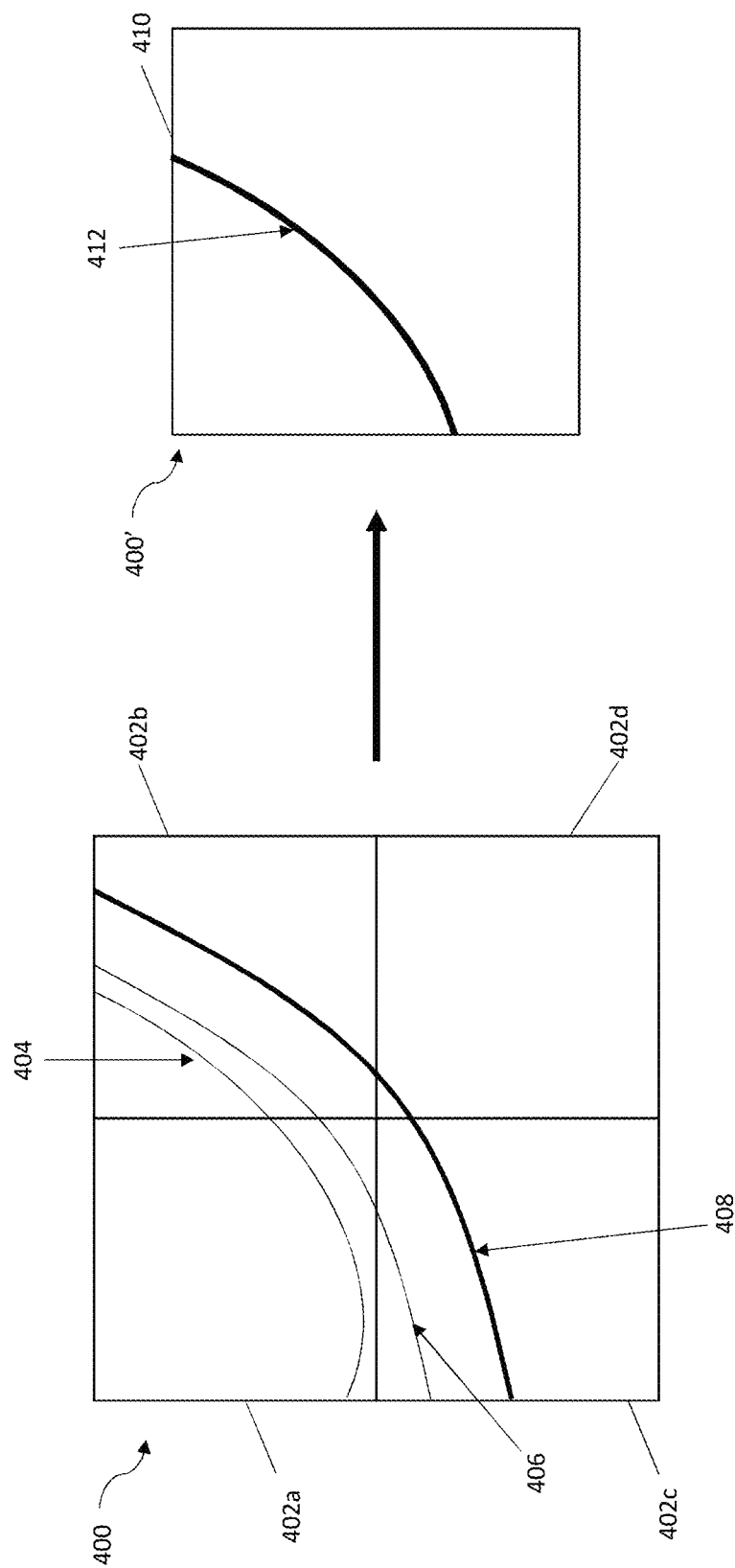
FIG. 4 is a diagram illustrating a further example one or more aspects described herein in use.

FIG. 4 provides a further example of a transformation function to be applied to a set of vector tiles. FIG. 4 shows part of a first zoom level 400 comprising four vector tiles 402a-d, each tile representative of a geographic area. For example, each tile 402a-d may be representative of an area of 1 km². Each vector tile 402a-d may comprise one or more vector features which may be divided into sub-layers according to the feature type, as described above. In the illustrated example, only the vector features relating to roads are shown. Here, a pair of roads 404, 406 extend through the first to third vector tiles 402a-c, and a third road 408 extends through the second to fourth vector tiles 402b-d. As a specific example, the first and second roads 404, 406 may be two sides of dual carriage way, whereas the third road 408 may be a motorway or highway. Each vector feature 404, 406 and 408 has geometry describing the three dimensional size and configuration of the roads, as well as various attributes. For example, the attributes may include the type of road that it is, the daily average number of vehicles, the age of the road and any other information that may be attributed to roads.

A transformation function may then be applied to these four vector tiles 402a-d in order to reduce the scale of the zoom level 400, for example, by a factor of 2, so as to generate a new single vector tile 410 representative of the same 4 km² previously represented by the original four vector tiles 402a-d. In applying the transformation function, the first and second vector features 404, 406 have been merged into the third feature 408 to form a single vector feature 412. This may have been done, for example, by taking an average of the vector geometry, with the geometry of the third vector feature 408 being weighted on the basis that it is representative of a major road. As such, the new feature 412 is geometrically more similar to the third road 408. Similarly, the new vector feature 412 may be positioned at a centroid point between the three original vectors 404, 406 and 408, the position of the third vector feature 408 again being weighted such that the new feature 412 is closer to the position of the third road 408.

The attributes may then be generalised in any number of ways, as described above. For example, the type of road for each of the three roads 404, 406, 408 may be added into the new vector feature 412, and the daily average number of vehicles may be added together, or alternatively, a mean of those averages may be taken.

Again, it will be appreciated that FIG. 4 is not drawn to scale and is only intended to provide an example of aspects described herein in use.

Figure 5:
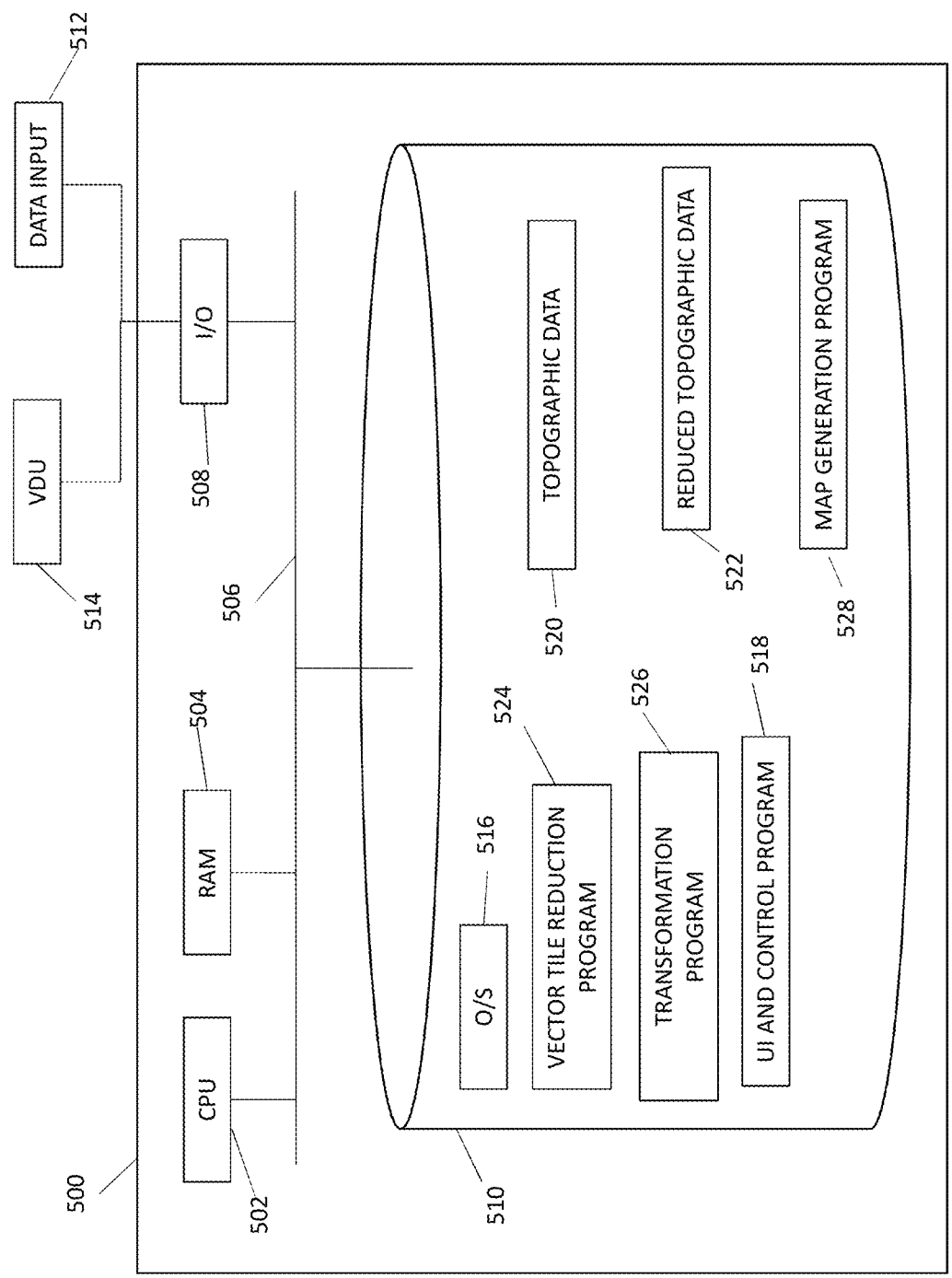
FIG. 5 is a block diagram illustrating a computer system on which one or more aspects described herein may be implemented.

FIG. 5 illustrates an example of a general computer system 500 that may form the platform for one or more illustrative embodiments described herein. Generally, the system 500 described below implements the method described in detail above, and reference should be made to the above when considering the various steps and processes described below.

The computer system 500 comprises a central processing unit (CPU) 502 and a working memory 504, connected by a common bus 506, and having an input-output (I/O) interface 508 arranged to receive control inputs from a user via a device connected to a data input port 512 such as a keyboard, mouse, or other controller, and provide output information via a user interface which is displayed on an device having a visual display unit 514 such as a computer screen, television, mobile device or any other device capable of providing a visual display.

The computer system 500 is also provided with a computer readable storage medium 510 such as a hard disk drive (HDD), flash drive, solid state drive, or any other form of general-purpose data storage, upon which stored data and various programs are arranged to control the computer system 500 to operate in accordance with one or more illustrative embodiments described herein. For example, stored on the computer readable storage medium 510 is an operating system program 516 that when run by the CPU 502 allows the system to operate. Also provided is a vector tile reduction program 524, a transformation function program 526 and a map generation program 528 which together implement aspects described herein when run by the CPU 502, as will be described in more detail below. In order to interface with the vector tile reduction program 524, transformation function program 526 and map generation program 528, a user interface and control program 518 is also provided, that controls the computer 500 to provide a visual output to the VDU 514, and to receive user inputs via a keyboard, or another peripheral such as a mouse connected to the data input port 512, in order to control the vector tile reduction program 524, transformation function program 526 and map generation program 528.

Input data upon which the vector tile reduction program 524 operates includes data input to the computer system 500 received via the data input port 512. Such data may include instructions identifying a particular geographic area, as well as instructions as to the map scale required. The vector tile reduction program 524 then uses topographic data 520 stored on the computer readable storage medium 510 to perform the method described above. In this respect, the topographic data 520 comprises all of the vector features including their geometry, feature type and attributes.

Firstly, the vector tile reduction program 524 is configured to divide the zoom level formed by the topographic data 520 into vector tiles, and if necessary divide the zoom level into any sub-layers according to the type of vector features contained therein, as described above. Once the vector tiles and sub-layers have been identified, the transformation function program 526 is then configured to apply a transformation function to the vector tiles according to the scale required. As discussed above, one or more different transformation functions may be applied to each zoom level, for example, depending on the type of vector features contained therein. Once the vector tiles have been reduced in scale according to the transformation function, the vector tile reduction program 524 may then be further configured to store the new vector features resulting from the reduction in scale as new reduced topographic data 522. In this respect, the vector tile reduction program 524 may first combine any new sub-layers resulting from the transformation to produce the new smaller scale zoom level, as described above.

The map generation program 528 is then configured to generate a map image based on the new reduced topographic data 522 for output to a user, for example, via the visual display unit 514.

Figure 6:
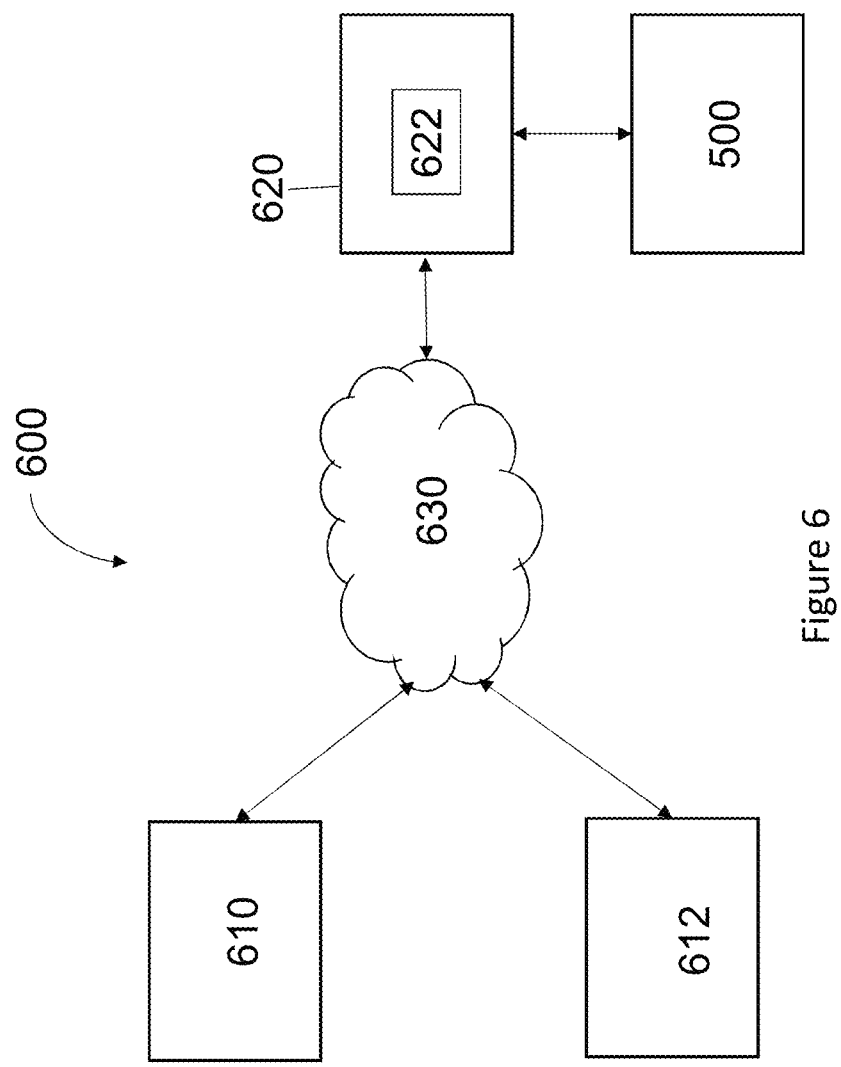
FIG. 6 is a block diagram illustrating an example system in which one or more aspects described herein may be implemented.

An example of a system in which the above computer system 500 may be used will now be described. FIG. 6 shows a system 600 comprising a server 620 in communication with third party servers 610, 612 via a network 630 through a communications interface 622. The server 620 is also in communication with the computer system 500 described with reference to FIG. 5. The server 620 is arranged to receive data relating to a geographic area from one or more of the third party servers 610, 612 (for example, the server on which the user's device is running), from which the underlying topographic data 520 is generated and updated. For example, image data may be received from an organisation providing land surveying, weather data may be received from a national weather service, crime rate data may be received from a police organisation, as well as any other data that may be used to describe the geographic area. This data is then communicated to the computer system 500 where it is processed and stored as topographic data 520. The server 620 is also arranged to receive instructions from one or more of the third party servers 610, 612, for example, receiving instructions requesting a map image of a particular geographic area at a particular scale. The received instructions are then communicated to the computer system 500, which will then generate new reduced topographic data 522 using the above method. The computer system 500 may then use the reduced topographic data 522 to output a new map image at the desired scale to the server 620 for distribution to the third party servers 610, 612. In some cases, reduced topographic data 522 for the scale required may have been generated previously and will already be stored on the computer system 500 ready for output.

Illustrative use cases will now be described.

In digital mapping, the demand for personalised maps has significantly increased, in particular, personalised maps where the user has the ability to glance at a map at any scale and gain an understanding of the type of place, and where they are able to zoom in and discover more specific places. In this respect, types of place might include leisure, residential, dining, visitor accommodation, nightlife or any other term that may be used to describe a location. For example, urban cities have areas that can change significantly based on the time of day and, often, time of the year. Within Southampton, UK, some dining areas morph into nightlife areas on certain days, which is heavily influenced by the student population. Therefore, the ability to learn more about an area depending on the user's needs, as well as other dynamic variables such as time of day or year is desirable.

Daytime Example

The concept of place discovery is something in which the above method and systems may be of use. An example of this will now be described with reference to FIGS. 5 and 6. The server 620 first receives a first set of instructions from a user via a third party server 610, requesting personalised mapping for the city of Southampton, UK, during the day. The server 620 communicates these instructions to the computer system 500, where the underlying topographic data 520 will be extracted and used to generate four zoom levels having different levels of detail. For example, the four zoom levels to be generated may comprise the following level of detail (LoD):

1) Small Scale Place (e.g. urban, rural, infrastructure, water)
2) Medium Scale Place (e.g. hospitality, public service)
3) Place Area (e.g. accommodation, food service, leisure and tourism, medical, law enforcement)
4) Property unit (e.g. hotel apartment, bed and breakfast, restaurant, bar, supermarket, cinema, swimming pool, hospital, doctor surgery, dentist)

The vector tile reduction program 524 will start from the highest level of detail (buildings on the ground, as defined by LoD 4) and then reduce the topographic data 520 to lower levels of detail (shapes around areas, as defined by LoD 1). This reduced set of data is simpler to process, enabling reduced processing times for other computational processes, as well as providing the underlying topographic data 520 in a simpler form to enable rapid human interpretation.

Create LoD (4)

For each vector tile in the first zoom level, the transformation program 526 applies a first transformation function such that the features of the vector tiles (e.g. buildings, parks etc.) are transformed to include their daytime classification. In doing so, the transformation function applied may remove any unnecessary attributes associated with the features, such as their night time classification.

For example, features that operate as a restaurant by day and a nightclub by night may gain a "restaurant" classification. Similarly, various other buildings within the area are labelled with their feature type, such as hotel, rental apartment, shop, cinema, swimming pool, hospital, police station and the like. This classification might be obtained from external data received from other third party servers 612.

The map generation program 528 can then generate a map image showing the transformed zoom level having the same level of detail as before, that is, the highest level of detail, but modified so as to visually represent the different classifications. For example, the transformed zoom level will have the same scale, however, the classified features may be coloured according to the categories. Features classified as "restaurant" might be coloured pink, whereas features classified as "hotel" might be coloured orange.

The transformed LoD 4 map image can then be output for distribution to the third party server 610 of the user.

Create LoD (3)

To create the next zoom level, the transformation program 526 applies a second transformation function to the LoD 4 vector tiles, which merges adjacent features that share the same classification, for example, accommodation, food service, leisure and tourism, medical, and the like. As such, adjacent restaurant features are merged together, features such as rental properties, hotels, bed and breakfasts, and inns are classified as accommodation features, and so forth to create areas of place. In doing so, the transformation function applied to the vector tiles might discard areas deemed too small, and possibly associate those areas with the encompassing feature. For example, a hospital might have features classified as "restaurant" and "shop", but they would be absorbed due to their small size by the encompassing "medical" feature.

The merged features might also contain process specific attributes (for example, sum, max, min, mean values), such as a count for the number of units given the classification within the area.

For example, where a group of rental properties, hotels, bed and breakfasts, and inns has been generalised to a single feature classified as accommodation, the generalised attributes of the generalised feature may include the feature type (i.e. building, accommodation), the number of units within the generalised feature, the total customer rating of the units within the generalised feature, as well as the mean rating, the maximum rating and the minimum rating.

In applying the transformation function, the LoD 4 vector tiles can be reduced to any appropriate number of LoD 3 vector tiles according to the scale required, for example, four vector tiles may be reduced to one vector tile.

Should any of the resulting LoD 3 vector tiles be identical to any existing tiles at any zoom level, for example, created by a previous vector tile reduction process, then the existing vector tile need not be invalidated, thus preventing needless further processing. That is to say, the existing vector tile will be not be unnecessarily replaced by the new vector tile.

Whilst geography specific, the transformation process might form new features from more distributed but significant features, such as electrical pylons, road and rail systems, that might cast an "infrastructure" shadow area. That is to say, there may be features that have a relatively small spatial shape and size when viewed individually at the highest level of detail, but that collectively grow in relative size as they are generalised together each time the scale of the vector tiles is reduced. Similarly, places (for example, having a shopping classification) might have "buffered" shapes which lose direct association with the underlying geography, that is to say, the buffer placed around the vector feature may show the feature as taking up more physical space than it actually does. Furthermore, spatial shape and size might only be one aspect of significance. For example, a nuclear power station might be relatively small in comparison to neighbouring "Woodland" but might be buffered and promoted during the transformation process due to its significance in classification. As such, feature significance might consider both feature attribution in addition to spatial characteristics.

Create LoD (2)

To create the next zoom level, the transformation program 526 applies a third transformation function to the LoD 3 vector tiles. This process might group features that have a classification belonging to a set of classifications. For example, adjacent features having a classification relating to accommodation, food service, leisure and tourism may be grouped together as a more generic hospitality category. As such, adjacent features with a classification within that set might be merged to create a larger feature, and classified as hospitality.

As before, areas deemed too small for that zoom level may be discarded and, possibly, associated with an encompassing area.

The resulting LoD 2 vector tile therefore contains generalised geographic features with broad categories, for example, hospitality, agriculture, manufacturing, construction, transportation, education, and the like.

Likewise, should the resulting LoD 2 vector tile be identical to an existing tile at any zoom level, for example, created by any prior processing, then again the existing vector tile need not be invalidated.

Create LoD (1)

To create the final zoom level, the transformation program 526 applies a fourth transformation function to the LoD 2 vector tiles. In doing so, the features of the LoD 2 vector tiles may be grouped into a further set of classifications, for example, rural, urban, infrastructure, water, and the like.

Night Time Example

The server 620 may then receive a second set of instructions from a user via the third party server 610, requesting personalised mapping for the city of Southampton during the night. As before, the server 620 communicates these instructions to the computer system 500, where the underlying topographic data 520 will be extracted and used to generate four zoom levels.

Create LoD (4)

For each vector tile in the first zoom level, the transformation program 526 applies a first transformation function such that the features of the vector tiles (e.g. buildings, parks etc.) are transformed to include their night time classification. In doing so, the transformation function applied may remove any unnecessary attributes associated with the features, such as their daytime classification.

For example, features that operate as a restaurant by day and a nightclub by night may now gain a "nightclub" classification, whereas they had previously been given a "restaurant" classification. Similarly, various other buildings within the area may gain a "closed" classification. As before, this classification might be obtained from external data received from other third party servers 612.

The map generation program 528 can then generate a map image showing the transformed zoom level having the same level of detail as before, that is, the highest level of detail, but modified so as to visually represent the different classifications. For example, the transformed zoom level will have the same scale, however, the classified features may be coloured according to the categories. Features classified as "nightclub" may be coloured pink, whereas "closed" classified features may be coloured grey. In doing so, the transformed zoom level provides a visually different map to the daytime version.

The transformed LoD 4 map image can then be output for distribution to the third party server 610 of the user.

Create LoD (3)

To create the next zoom level, the transformation program 526 applies a second transformation function to the LoD 4 vector tiles, which merges adjacent features that share the same type of classification. For example, adjacent features having a classification of nightclub, live music, theatre, pubs, and the like, may be transformed into a single feature having a more generic category of nightlife. Similarly, adjacent features having a closed classification may be merged together, regardless of their daytime classification. For example, a shop, a café, a dentist and a swimming pool that are closed at night may be merged together as a single feature.

As before, the transformation function may be configured to discard areas deemed too small and, possibly, associate those areas with encompassing features.

Merged feature might contain process specific attributes (e.g. sum, max, min, mean values), such as a count for the number of units given the classification within the area. For example, where a group of adjacent features having a classification of nightclubs, live music, theatres and pubs has been generalised to a single feature classified as nightlife, the generalised attributes of the generalised feature may include the feature type (i.e. building, nightlife), the number of units within the generalised feature, the total customer rating of the units within the generalised feature, as well as the mean rating, the maximum rating and the minimum rating.

In applying the transformation function, the LoD 4 vector tiles can be reduced to any appropriate number of LoD 3 vector tiles according to the scale required, for example, four vector tiles may be reduced to one vector tile.

Should any of the resulting LoD 3 vector tiles be identical to any existing tiles at any zoom level, for example, created by a previous vector tile reduction process, then the parent vector tile need not be invalidated, thus preventing needless further processing.

Performing the vector tile reduction based on different characteristics of the vector features, such as the night time and day time characteristics, might create vastly different sets of vector features at high levels of detail, which may then be aggregated to quickly convey the type of place.

Depending on the classification criteria, however, it might be the case that the vector features at the smaller scales maintain broad classifications with subtle changes in shape. For example, in the night time example, after creating the next zoom layer by applying a third transformation function to the LoD 3 vector tiles, it may be that the vector features are all aggregated together in substantially the same way as in the day time example with only some minor changes in shape, for example, to account for those features that are no longer open for business.

In summary, reducing the vector tiles using a pyramid structure facilitates distributed data processing. Furthermore, the structured reduction ensures that needless processing can be avoided by stopping further processing should identical results be produced when compared to existing data. That is to say, when reducing a set of vector tiles to a particular zoom level according to a particular set of characteristics, if an identical set of vector tiles already exist at that particular zoom level, then no further processing is required.

Furthermore, large scale changes in a geographic area, such as an increase in population count within a unit can "ripple" up to smaller scales extremely quickly (for example, to national scale). This helps ensure that users can maintain excellent situation awareness, which might be significantly enhanced by data received from smart sensors (for example, CCTV sensors with body count algorithms). The increase in situation awareness can help individuals to obtain a better understanding of their rapidly changing environment. Moreover, it helps to improve efficiency and location discovery, where places such as Notting Hill (London) are transformed during the annual carnival.

As described above, the result of the generalisation can be visualised and interrogated using a digital map, but can also be presented as tables, charts or as data feeds into other applications. This will be particularly relevant for point data, where only a representative point is generated that carries a summary of the attribution. For example, buildings classified as accommodation within a suburb or city can be summarised and represented by a point feature, by totalling the number of individual data points, that is, the individual building features classified as accommodation, and calculating their average customer rating.

Further Examples

Aspects described herein provide an improved approach to geographic data reduction, in which there are a number of strategies that can be employed as part of the transformation function to help ensure rapid generalisation depending on the type of data and the demands of the reduction process.

To effectively and reliably reduce the vector tiles based on the geometry and the attributes thereof, there are a number of different factors that need to be taken into consideration when choosing which strategy to adopt, particularly in order to ensure that any changes in the underlying topographic data accurately propagate up through the different zoom levels.

Figure 7A:
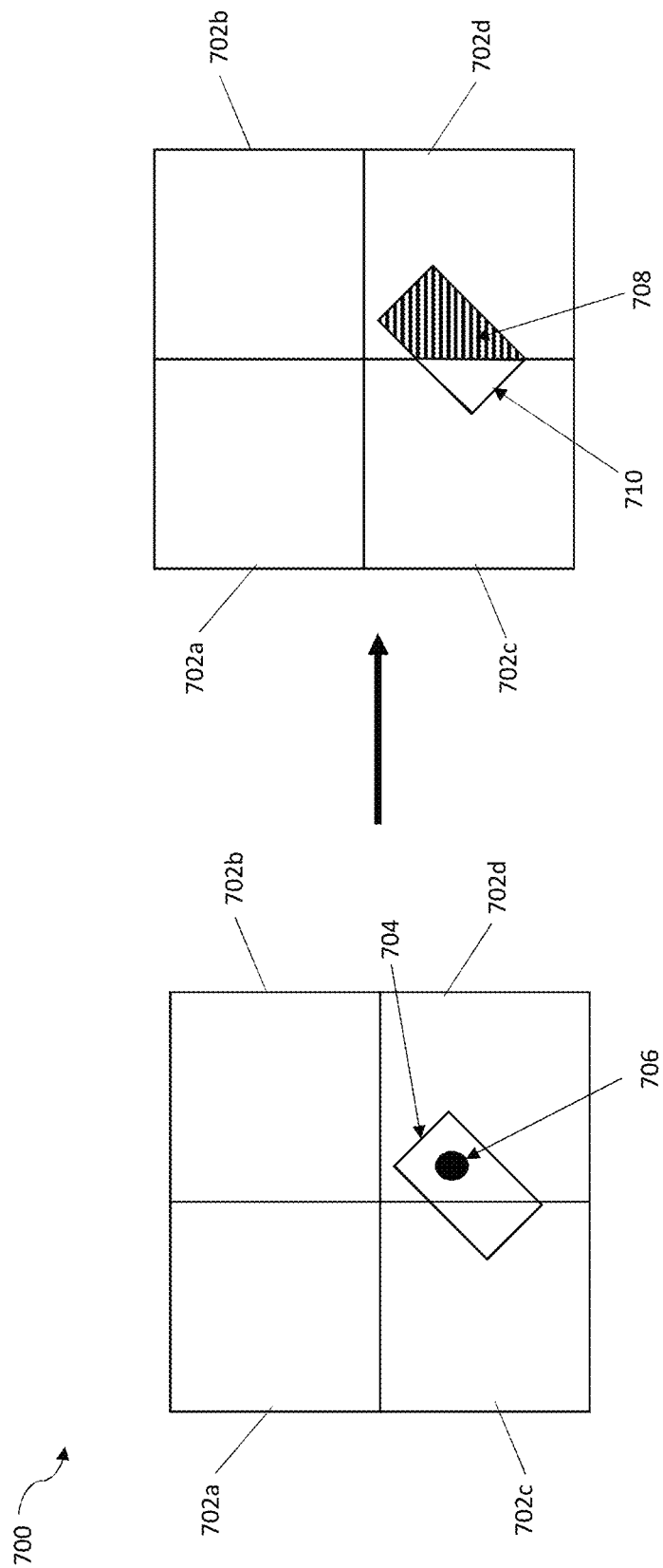
FIGS. 7A and 7B illustrate a further example of one or more aspects described herein in use.
Figure 7B:
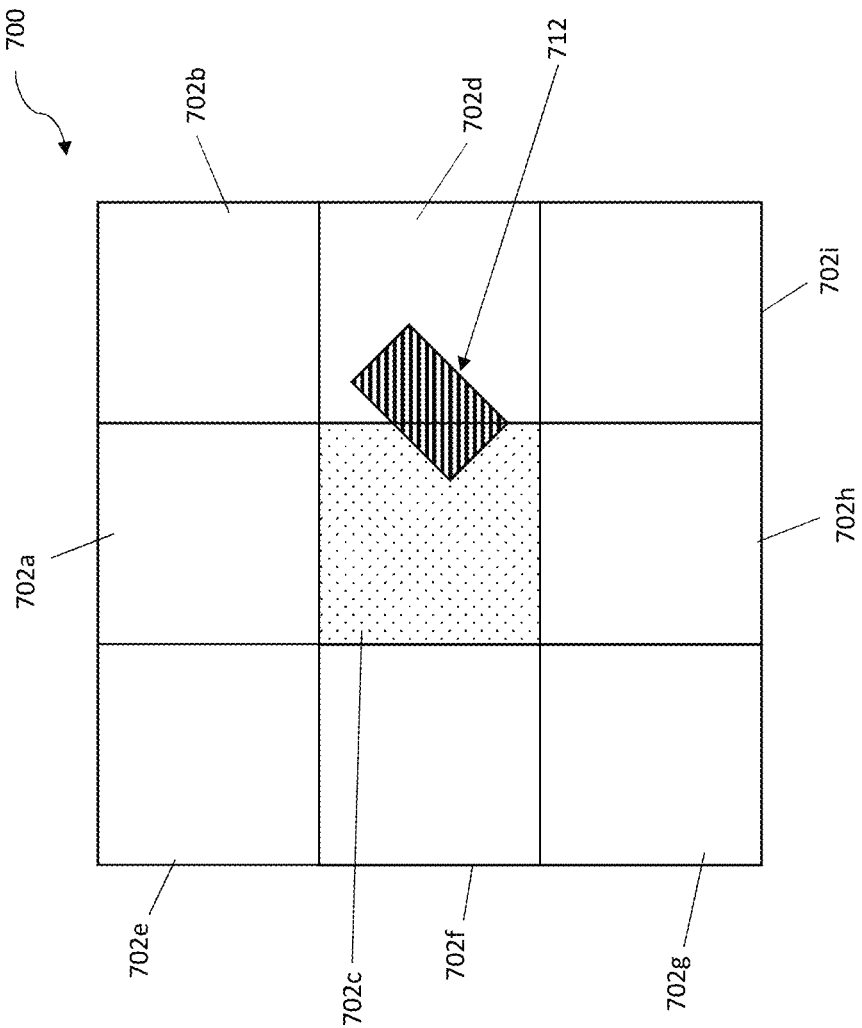

FIGS. 7A and 7B provide an example in which neighbouring vector tiles in a first zoom level 700 are processed in order to associate nearby geometries with one another to thereby ensure that any changes in the underlying topographic data are accurately processed. FIG. 7A shows part of the first zoom level 700 comprising four vector tiles 702a-d, each tile representative of a geographic area. For example, each tile 702a-d may be representative of an area of 1 km². A polygon feature 704, for example, a building, extends across the third and fourth vector tiles 702c-d. A new attribute data point 706, for example, a restaurant classification associated with a geographical address, has been added to the fourth vector tile 702d, which is immediately updated to associate the polygon fragment 708 therein with the new attribute data 706. However, this update has not occurred across the whole of the polygon feature 704, and thus the restaurant classification has not been associated with the polygon fragment 710 in the third vector tile 702c. To remedy this, the vector tile reduction process will sweep through the neighbouring vector tiles 702a-i, as shown in FIG. 7B, to thereby determine that a fragment 710 of the polygon feature 704 is located in the adjacent vector tile 702c, thus ensuring that the whole of the original polygon feature 704 is associated and updated with the new attribute 706, to thereby generate a new updated polygon feature 712. This sweep process is therefore particularly important for ensuring that features that cross vector tile boundaries are updated correctly.

A number of different techniques may be employed to determine that the fragment 710 in the third vector tile 702c is part of the same polygon feature as the fragment 708 in the fourth vector tile 702d. For example, the vector tile reduction process may inspect the two vector tiles 702c-d to see if there is any duplication of features, the polygon feature 704 may be associated with a unique ID, wherein the vector tile reduction process matches fragments with the same ID, or the vector tile reduction process may apply a buffer to the vector tiles 702c-d to identify whether the respective buffers comprise overlapping geometries.

A suitable transformation function, as described above, may then be applied to the affected vector tiles 702c-d in the first zoom level 700 to generate new reduced vector tiles at other zoom levels in order to account for the updated polygon feature 712. For example, the vector tiles 702a-i in this first zoom level may have previously been reduced to second set of vector tiles in a second zoom level (not shown) in which the original polygon feature 704 had been aggregated with a number of other polygon features within that first set of vector tiles 702a-i to form a single reduced polygon feature in the second zoom level. As such, the new attribute data associated with the updated polygon feature 712 may result in changes to the attribute data associated with the reduced polygon feature in the second zoom level. If the changes in the first zoom level 700 do not result in any changes to any of the smaller scale zoom levels, that is, the geometry and attributes of the vector features therein remain the same, then the existing vector tiles are retained and no further processing is required.

It will also be appreciated that the vector tile reduction process may continuously sweep through the vector tiles to determine whether any changes are required, or in response to the detection of a change in one individual vector tile.

In the present example, where the polygon feature 704 crosses the boundary of two vector tiles 702c-d at a single location and does not exceed the vector tile distance, a single sweep is sufficient to associate the attribute data 706 with the polygon fragments 708, 710. However, as demonstrated in FIGS. 8A-D, multiple sweeps may be required in order to identify all of the polygon feature fragments, for example, where the geometry of the vector features span several cells and/or crosses a vector tile boundary at multiple points.

FIG. 8A shows part of the first zoom level 800 comprising two vector tiles 802a-b, each tile representative of a geographic area. A polygon feature 804, for example, a building, extends across both vector tiles 802a-b. As before, a new attribute data point 806 has been added to the second vector tile 802a, which is immediately updated to associate the attribute with the polygon fragment 808 immediately surrounding the attribute data point 806, as shown in FIG. 8B. However, this update has not occurred across the whole of the polygon feature 804, and thus the attribute has not been associated with the other two polygon fragments 810 and 812 located in the first vector tile 802a and second vector tile 802b respectively. To remedy this, the vector tile reduction process will first sweep through the neighbouring vector tile 802a, as shown in FIG. 8C, to determine that another fragment 810 of the polygon feature 804 is located in the adjacent vector tile 802a, and update this fragment 810 with the new attribute 806 accordingly. The process will then sweep through the second vector tile 802b again, as shown in FIG. 8D, to determine that a further fragment 812 of the polygon feature 804 is located in the initial vector tile 802b, and update this fragment 812 with the new attribute 806 to thereby generate a new updated polygon feature 814.

Once again, a transformation function may then be applied to the affected vector tiles 802a-b in the first zoom level 800 to generate new reduced vector tiles at other zoom levels in order to account for the updated polygon feature 814.

It is often important to preserve feature attributes across all fragments. Features that span across boundaries therefore should have their attributes duplicated to ensure that each tile maintains all data for the given geographic area without dependency on adjacent tiles. Consequently, a strategy must be employed to avoid double counting any duplicated attributes during subsequent reduction processes.

In this respect, fragmented features, that is, those whose geometry spans across multiple vector tiles, can pose a challenge when reducing attribution data since it is easy to count the attributes multiple times for each of the vector tiles it spans, whereas those attributes should only be counted once during the reduction process. As such, one solution is to mark the attributes in one fragment located in one vector tile for inclusion in the vector reduction, and then subsequently process the reduced vector feature to associate the attributes with any other fragments located in other vector tiles.

FIGS. 9A-D provide an example in which the attributes are associated with the most significant geometry component of the reduced vector feature, and a sweep operation applied to assign the reduced attributes to all fragments of the reduced vector feature. FIG. 9A shows part of a first zoom level 900 comprising eight vector tiles 902a-h, each tile representative of a geographic area. Two polygon features 904 and 906, for example, two buildings, are identified in the first zoom level 900, each polygon feature 904 and 906 having attributes associated therewith. In FIG. 9B, the attributes are assigned as respective data points 904a and 906a within the polygon features 904 and 906. In FIG. 9C, a suitable transformation function is then applied to the geometry of the polygon features 904 and 906 to produce a generalised polygon feature 908 corresponding to a new smaller scale zoom level 900', wherein four vector tiles in the first zoom level 900 are reduced to a single vector tile in the smaller scale zoom level 900', as shown in FIG. 9D. For example, each polygon feature 904 and 906 may be provided with a positive buffer of a certain distance, which thereby expands the geometry and creates an overlap with nearby vector features. The overlapping features may then be merged, and a negative buffer applied having the same distance as the positive buffer, to thereby create the generalised representation 908.

At the same time, the attribute data points 904a and 906a are merged, for example, by summing them, to generate a single attribute data point 908a located within the vector tile 902b' containing the most significant fragment 910 of the reduced polygon feature 908. A sweep operation is then applied to any adjacent vector tiles to ensure that the new attribute data point 908a is associated with any other fragments of the polygon feature 908, which in this case is the smaller fragment 912 located within the other vector tile 902a'. Where there are multiple vector tiles to process, the sweep operation can occur in parallel to merge attributes and assign them to individual feature fragments.

Figure 10B:
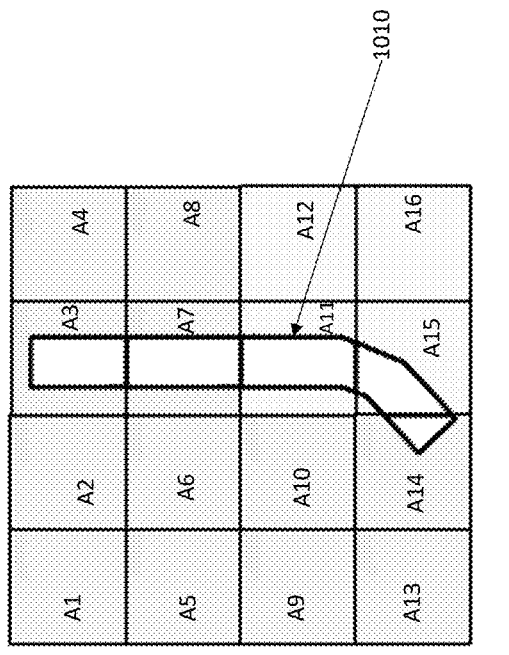
FIGS. 10A-C illustrate a further example of one or more aspects described herein in use.
Figure 10A:
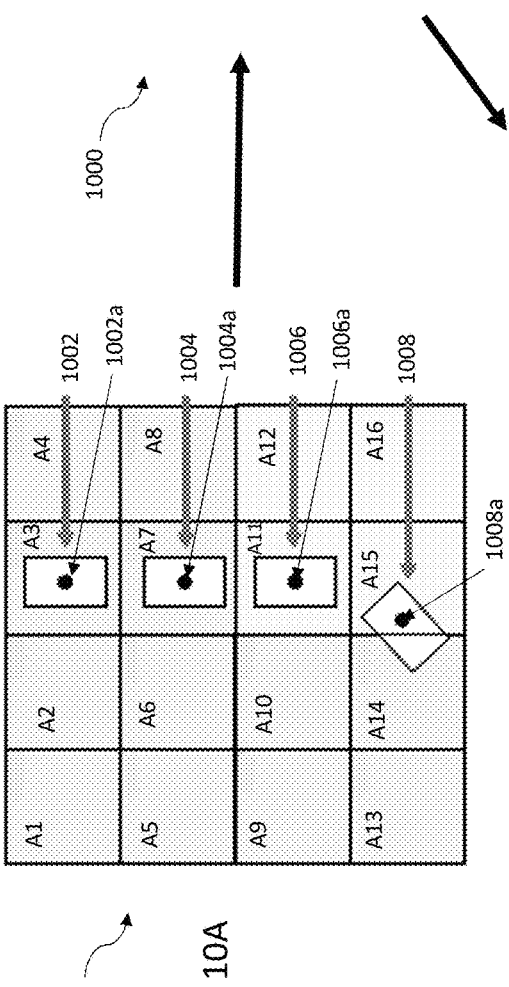
Figure 10C:
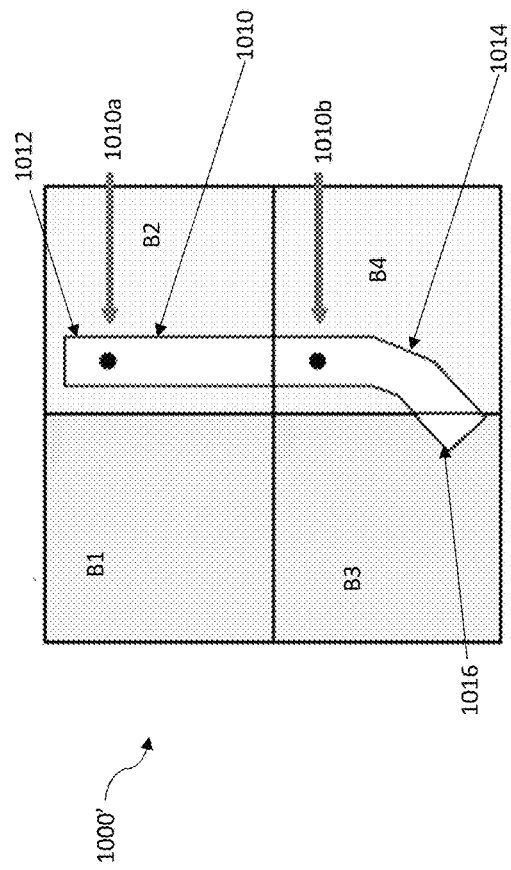

FIGS. 10A-C provide a further example of attribution association, wherein the geometries of the vector features span multiple vector tiles. FIG. 10A shows part of a first zoom level 1000 comprising sixteen vector tiles A1-A16, each tile representative of a geographic area. Four polygon features 1002, 1004, 1006 and 1008, for example, four buildings, are identified in the first zoom level 1000 that span five of the vector tiles (A3, A7, A11, A14 and A15), each polygon feature 1002, 1004, 1006 and 1008 having attributes associated therewith. As before, the attributes are assigned as respective data points 1002a, 1004a, 1006a and 1008a within the polygon features 1002, 1004, 1006 and 1008. In FIG. 10B, a suitable transformation function is then applied to the geometry of the polygon features 1002, 1004, 1006 and 1008 to produce a generalised polygon feature 1010 for propagation to a new smaller scale zoom level 1000', as shown in FIGS. 10B-C, wherein four vector tiles in the first zoom level 1000 are reduced to a single vector tile in the smaller scale zoom level 1000'. Here, the polygon features 1002, 1004, 1006 and 1008 in the first zoom level 1000 have been reduced to a single feature 1010 that spans three vector tiles (B2-B4) of the smaller scale zoom level 1000' such that reduced polygon feature 1010 comprises three fragments 1012, 1014 and 1016.

For each of the parent vector tiles B1-B4 in the smaller scale zoom level 1000', the attribute data points 1002a, 1004a, 1006a and 1008a of the corresponding children tiles A1-A16 in the first zoom level 1000 are merged using an appropriate transformation function. In this example, the attribute data points 1002a and 1004a within vector tiles A3 and A7 are reduced to a single attribute data point 1010a located in parent vector tile B2. Similarly, the attribute data points 1006a and 1008a within vector tiles A11 and A15 are reduced to a single attribute data point 1010b in parent vector tile B4. A sweep operation is then applied to all adjacent vector tiles B1 and B3 to ensure that the new attribute data points 1010a and 1010b are associated with any other fragments of the polygon feature 1010, in this case the smaller fragment 1016 located within the third vector tile B3.

In choosing the appropriate strategy for reducing vector tiles and propagating changes thereto, it is important to consider whether the geometry is large or small, specifically, whether the geometry of the vector feature is small relative to the size of the highest resolution tile. If the geometry is relatively small, then it might be trivial to propagate a geometry change since these features will not make a significant, if any, change to the vector tiles at the smaller scale zoom levels. Examples of such features may be buildings, vehicles, available parking bays and the like. In contrast, geometries covering a large area such as woodlands, national parks, roads, waterways and the like might benefit from additional processing in order to reliably propagate any changes up to smaller scale zoom levels.

Consider, for example, a motorway or highway spanning hundreds of miles, which has been fragmented to approximately 100 m² sections and has a name change applied to it such that new attribute data has been generated for one fragment of that vector feature in the underlying topographic data. To propagate this change across the whole geographic area that this road spans would require many sweep iterations before all of the vector tiles in the first zoom level are completely updated with the new attribute data. As such, where there has been a change to a fragment of a large scale vector feature which is part of a geometry covering a large geographic area relative to the size of the vector tile, the techniques described with respect to FIGS. 7-9 may not be suitable for propagating that change up through the zoom levels.

As such, an alternative strategy is required in order to quickly and efficiently process changes to vector feature geometries covering large areas. One key benefit of fragmented vector features is that the initial update process need only be concerned with the area, and corresponding vector tiles, in which the change has occurred. This ensures that users and systems have access to the latest data at high resolution and that large scale changes are handled separately. For example, the UK coastline is continuously changing with respect to tide and waves. A sensor might monitor the coastline and update vector tiles at 10 Hz. The fragmented approach means that only the area of interest needs to be updated, such as a beach, which ensures that users and systems gain access to change quickly. In contrast, a unified feature approach might require that the entire coastline feature, spanning thousands of kilometres, be updated. Consequently, updates might need to be carefully considered in a unified feature approach due to the complexity of the entire UK coastline. A disadvantage of the fragmented approach, however, is that by the very fact that data is fragmented, apparently 'small attribute changes' need to propagate throughout the whole feature. In the above motorway name change example, a road spanning 188 km across vector tiles covering 1 km each, may require around 187 changes until the new attribute data has rippled through all of the vector tiles containing the motorway. Such a ripple change operation is linear and therefore the update might take an unacceptable amount of time.

One solution to this is to employ a strategy in which the change is first propagated to a small scale tile, which then invalidates the large scale tiles and applies the change thereto in parallel. With sufficient computational resource, one would expect the parallel execution to complete quicker than through linear execution.

Figure 11:
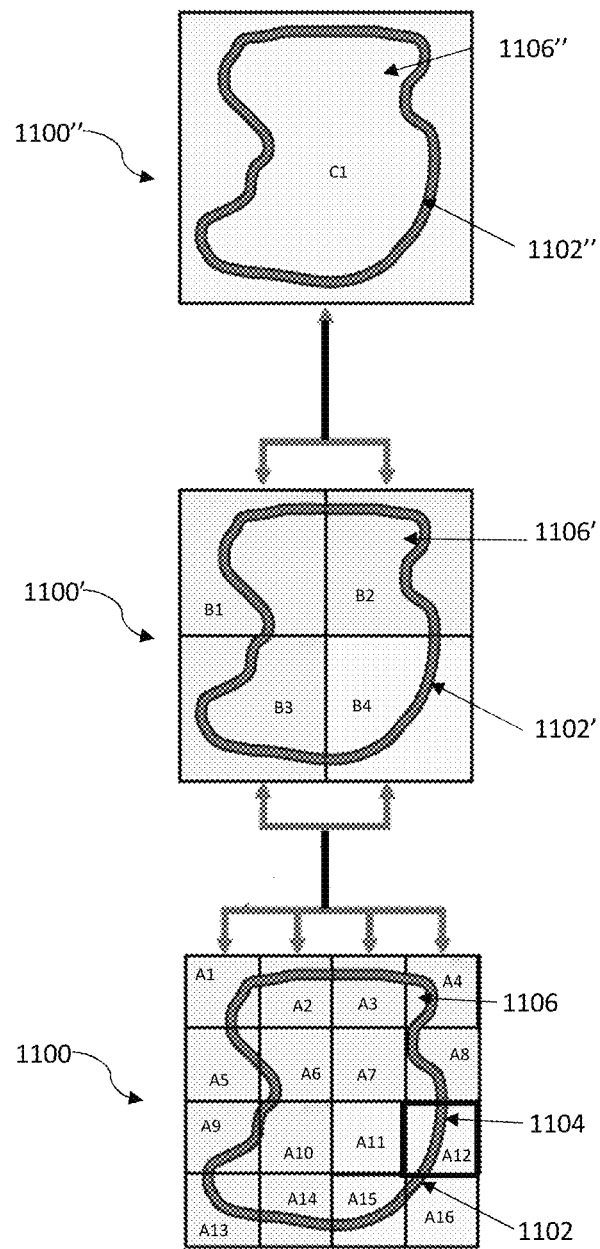
FIG. 11 illustrates a further example of one or more aspects described herein in use.

FIG. 11 illustrates an example of a strategy in which the changes are first propagated to a smaller scale zoom level. FIG. 11 shows a geographical area shown at a first zoom level 1100, a second zoom level 1100' and a third zoom level 1100", decreasing in scale from the first zoom level 1100 to the third zoom level 1100". Taking the previous motorway example, each zoom level 1100, 1100' and 1100" includes a line feature 1102, 1102' and 1102" representative of a road. Consider now that the road has changed name, the change of name being recorded as a large scale change of attribute data associated with the fragment 1104 located in one vector tile A12 of the first zoom level 1100. This change in attribute data is first propagated up to the corresponding vector tiles of the second and third zoom levels 1100' and 1100", which in this case is vector tiles B4 and C1 respectively. The change may then be propagated back down from the third zoom level 1100" to the first zoom level 1100 to invalidate and update the fragments of the line features 1102 and 1102' in the remaining vector tiles where the change has not yet been recorded. For example, in the second zoom level 1100', vector tiles B1-B3 are invalidated and the fragments of the line feature 1102' contained therein are updated with the new attribute data to generate a new set of updated vector tiles. Similarly, in the first zoom level 1100, vector tiles A1-A10 and A13-A16 are invalidated and the fragments of the line feature 1102 contained therein are updated with the new attribute data to generate a new set of updated vector tiles at this larger scale.

The process described with respect to FIG. 11 may also be extended to create polygon features from line features. This may be useful for constructing boundaries of areas, for example, national park boundaries which have been recorded at a larger scale as lines but require transformation to a polygon feature to show coverage of the national park. In this respect, fragmented geometry such as polygons reduce the complexity of geospatial operations. An intersection, for instance, need only be concerned with the area of interest, such as the data within a single tile. This is in contrast to considering the entire geometry, which could be vast in the case of a national park.

Consider that the line features 1102, 1102' and 1102" shown in FIG. 11 correspond to the boundaries of a national park shown at the first, second and third zoom levels 1100, 1100' and 1100". The national park boundaries are recorded and updated as line features 1102 at the highest resolution in the first zoom level 1100. Changes are propagated to the second zoom level 1100' and then the third zoom level 1100", where the line feature 1102" creates a small scale ring that spans across a small number of vector tiles, in this case, one vector tile C1. This small scale ring can be transformed into a polygon feature 1106" corresponding to the area enclosed by the line feature 1102".

The resulting polygon feature 1106" in the third zoom level 1100" may then be combined with fragments of the line feature 1102' in the second zoom level 1100' to generate further polygon features in each of the vector tiles B1-B4. For example, a polygon feature 1106' is generated in vector tile B2 corresponding to the area enclosed by the line feature 1102' and the boundaries of the vector tile B2. This can then be repeated from the second zoom level 1100' to the first zoom level 1100, with the resulting polygon feature 1106' in the second zoom level 1100' being combined with fragments of the line feature 1102 in the first zoom level 1100 to generate further polygon features in each of the vector tiles A1-A16. For example, a polygon feature 1106 is generated in vector tile A4 corresponding to the area enclosed by the line feature 1102 and the boundaries of the vector tile A4. In cases where a vector tile is contained within the ring but not containing any line geometry, for example, vector tile A11, will comprise a polygon feature covering the full extent of the vector tile.

In addition to the above, a further factor to consider when choosing appropriate vector tile reduction strategies is whether the input and output data is area centric, that is, whether the initial vector features and the vector feature resulting from their reduction have the same geographical centre point. Aspects described herein propagate change with respect to space, whereby nearby geometries and attributes are generalised to propagate information of importance. If the initial vector features and the resulting vector feature do not have close spatial proximity, then the underlying topographic data may need to be restructured to create spatial proximity.

In such cases, it may be that the source data needs to be restructured to become area centric. For example, customer point data might exist where each customer has a "favourite store" attribute associated with a retail building. In reducing the vector tiles, the desire might be to highlight the most popular retail buildings in a particular geographic area. Whilst there might be some geographic correlation between the location of customers and specific retail buildings, it may also be possible for customers in one geographic area to have generated attribute data for a retail building in a second geographic location, for example, an Australian customer shopping online at a US store. In such cases, looking at the data of nearby vector tiles at high resolution might be very inefficient since the attribution data for that retail building will be wide spread. However, if the "favourite store" attribute is limited to a pre-defined distance, for example, 100 kilometres, then looking at neighbouring vector tiles becomes more viable. In the case of the Australian customer and US store example, one preferred strategy might be to map individual customers onto individual stores, which can then be reduced and mapped to an area.

Various modifications, whether by way of addition, deletion and/or substitution, may be made to all of the above described illustrative embodiments to provide further embodiments, any and/or all of which are intended to be encompassed by the appended claims.

The invention claimed is:

1. A computer-implemented method of generalising topographic data, the method comprising:
    obtaining a first topographic dataset relating to a geographical area, wherein the first topographic dataset comprises a first set of vector tiles at a first zoom level, the first set of vector tiles comprising one or more vector features having a geometry, a feature type and attribute data associated therewith; and
    generating a second topographic dataset relating to the geographical area comprising a second set of vector tiles at a second zoom level by applying at least one transformation function to the first set of vector tiles, the second set of vector tiles comprising one or more vector features having a geometry, a feature type and attribute data associated therewith;
    wherein the at least one transformation function generalises the vector features of the first set of vector tiles in dependence at least in part on the geometry, feature type and attribute data associated therewith, wherein the geometry and the attribute data of the vector features of the first set of vector tiles is generalised to provide the geometry and the attribute data of the vector features of the second set of vector tiles.

2. The method according to claim 1, wherein the at least one transformation function generalises a first number of vector tiles in the first set of vector tiles to generate a single vector tile in the second set of vector tiles.

3. The method according to claim 2, wherein the first number of vector tiles in the first set of vector tiles is defined by a scale of the second zoom level.

4. The method according to claim 1, comprising generating a map image of the geographical area at the second zoom level based on the second topographic dataset.

5. The method according to claim 4, wherein the map image at the second zoom level has a smaller scale than a map image of the geographical area generated based on the first topographic dataset.

6. The method according to claim 1, wherein the first topographic dataset comprises a first set of layers, each layer comprising vector features having a respective geometry and/or feature type, wherein the method comprises applying a respective transformation function to one or more of the first set of layers to generate a second set of layers in the second topographic dataset.

7. The method according to claim 6, wherein the transformation function for a layer of the first set of layers is selected in dependence on the geometry and/or feature type of the vector features contained therein.

8. The method according claim 1, wherein the at least one transformation function is configured to perform one or more of: aggregating one or more of the vector features of the first set of vector tiles, combining one or more of the vector features of the first set of vector tiles, simplifying one or more of the vector features of the first set of vector tiles, selecting one or more of the vector features of the first set of vector tiles, eliminating one or more of the vector features of the first set of vector tiles, exaggerating one or more of the vector features of the first set of vector tiles, amalgamating one or more of the vector features of the first set of vector tiles, collapsing one or more of the vector features of the first set of vector tiles, enhancing one or more of the vector features of the first set of vector tiles, or merging one or more of the vector features of the first set of vector tiles.

9. The method according to claim 1, wherein the method further comprises:
    detecting a change in the first topographic dataset; and
    updating the geometry and/or attribute data of at least one vector tile in the first set of vector tiles, and/or updating the geometry and/or attribute data of at least one vector tile in the second set of vector tiles in dependence on the detected change.

10. The method according to claim 9, wherein the geometry and/or attribute data of a vector tile in the second set of vector tiles is updated in dependence on the change detected in the first topographic dataset, the method further comprises updating the geometry and/or attribute data of at least one vector tile in the first set of vector features in dependence on the geometry and/or attribute data of the vector tile updated in the second set of vector tiles.

11. The method according to claim 1, further comprising:
    generating a third topographic dataset relating to the geographical area comprising a third set of vector tiles at a third zoom level, wherein the third topographic dataset is generated by:
    i) applying at least one transformation function to the first set of vector tiles, wherein the at least one transformation function generalises a second number of vector tiles in the first set of vector tiles to generate a single vector tile in the third set of vector tiles; or
    ii) applying at least one transformation function to the second set of vector tiles, wherein the at least one transformation function generalises a first number of vector tiles in the second set of vector tiles to generate a single vector tile in the third set of vector tiles.

12. The method according to claim 11, further comprising generating a map image of the geographical area at the third zoom level based on the third topographic dataset.

13. The method according to claim 11, wherein the method further comprises:

detecting a change in the first topographic dataset; and updating the geometry and/or attribute data of at least one vector tile in the third set of vector tiles in dependence on the detected change.

14. The method according to claim 13, wherein the method further comprises updating the geometry and/or attribute data of at least one vector tile in the first set of vector features in dependence on the geometry and/or attribute data of a vector tile updated in the third set of vector tiles.

15. A system comprising:

a processor; and a nontransitory computer readable medium storing one or more instruction(s) arranged such that when executed by the processor the system is caused to:

obtain a first topographic dataset relating to a geographical area, wherein the first topographic dataset comprises a first set of vector tiles at a first zoom level, the first set of vector tiles comprising one or more vector features having a geometry, a feature type and attribute data associated therewith; and generate a second topographic dataset relating to the geographical area comprising a second set of vector tiles at a second zoom level by applying at least one transformation function to the first set of vector tiles, the second set of vector tiles comprising one or more vector features having a geometry, a feature type and attribute data associated therewith;

wherein the at least one transformation function generalises the vector features of the first set of vector tiles in dependence at least in part on the geometry, feature type and attribute data associated therewith, wherein the geometry and the attribute data of the vector features of the first set of vector tiles is generalised to provide the geometry and the attribute data of the vector features of the second set of vector tiles.

16. The system according to claim 15, wherein the system is further caused to:

detect a change in the first topographic dataset; and update the geometry and/or attribute data of at least one vector tile in the first set of vector tiles, and/or update the geometry and/or attribute data of at least one vector tile in the second set of vector tiles in dependence on the detected change.

17. The system according to claim 16, wherein the geometry and/or attribute data of a vector tile in the second set of vector tiles is updated in dependence on the change detected in the first topographic dataset, the processor being further caused to update the geometry and/or attribute data of at least one vector tile in the first set of vector features in dependence on the geometry and/or attribute data of the vector tile updated in the second set of vector tiles.

18. The system according to claim 15, wherein the system is further caused to:

generate a third topographic dataset relating to the geographical area comprising a third set of vector tiles at a third zoom level, wherein the third topographic dataset is generated by:

i) applying at least one transformation function to the first set of vector tiles, wherein the at least one transformation function generalises a second number of vector tiles in the first set of vector tiles to generate a single vector tile in the third set of vector tiles; or ii) applying at least one transformation function to the second set of vector tiles, wherein the at least one transformation function generalises a first number of vector tiles in the second set of vector tiles to generate a single vector tile in the third set of vector tiles.

19. The system according to claim 18, wherein the system is further caused to:

detect a change in the first topographic dataset; and update the geometry and/or attribute data of at least one vector tile in the third set of vector tiles in dependence on the detected change.

20. The system according to claim 19, wherein the system is further caused to update the geometry and/or attribute data of at least one vector tile in the first set of vector features in dependence on the geometry and/or attribute data of a vector tile updated in the third set of vector tiles.

* * * * *